United States Patent
Nijhof et al.

(10) Patent No.: US 9,641,252 B2
(45) Date of Patent: May 2, 2017

(54) METHOD OF OPTIMIZING OPTICAL SIGNAL QUALITY IN AN OPTICAL COMMUNICATIONS LINK, OPTICAL NETWORK ELEMENT AND OPTICAL COMMUNICATIONS LINK

(75) Inventors: Jeroen Nijhof, Genoa (IT); Gianmarco Bruno, Genoa (IT); Anna Soso, Genoa (IT)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 70 days.

(21) Appl. No.: 14/418,818

(22) PCT Filed: Aug. 3, 2012

(86) PCT No.: PCT/EP2012/065258
§ 371 (c)(1),
(2), (4) Date: Jun. 20, 2015

(87) PCT Pub. No.: WO2014/019631
PCT Pub. Date: Feb. 6, 2014

(65) Prior Publication Data
US 2015/0304035 A1 Oct. 22, 2015

(51) Int. Cl.
H04B 10/08 (2006.01)
H04B 10/2543 (2013.01)
H04B 10/079 (2013.01)
H04B 10/293 (2013.01)
H04J 14/02 (2006.01)

(52) U.S. Cl.
CPC ..... *H04B 10/2543* (2013.01); *H04B 10/0793* (2013.01); *H04B 10/0795* (2013.01);
(Continued)

(58) Field of Classification Search
CPC .......... H04B 10/0795; H04B 10/07953; H04B 10/0793; H04B 10/079; H04B 10/0775; H04B 10/2543
(Continued)

(56) References Cited

U.S. PATENT DOCUMENTS 7,558,479 B1 7/2009 Robinson
8,055,129 B2 * 11/2011 Butler ................ H04J 14/0221
398/160
(Continued)

OTHER PUBLICATIONS

Mayrock, M. et al. "Monitoring of Linear and Nonlinear Signal Distortion in Coherent Optical OFDM Transmission" Journal of Lightwave Technology, IEEE Service Center, New York, NY, US, vol. pp, No. 16, Aug. 15, 2009, pp. 3560-3566, XP011262442, ISSN: 0733-8724.
(Continued)

*Primary Examiner* — Hanh Phan
(74) *Attorney, Agent, or Firm* — Leffler Intellectual Property Law, PLLC

(57) ABSTRACT

A method of optimizing optical signal quality in an optical communications link comprising a plurality of sections each comprising an optical amplification apparatus and an optical fiber span, the method comprising: for each section, determining a respective optimal optical channel power which minimizes a sum of an indication of a respective linear optical noise and an indication of a respective nonlinear optical noise; and generating and transmitting at least one control signal arranged to cause a target optical channel power of each section to be set to the respective optimal optical channel power.

20 Claims, 7 Drawing Sheets

(52) U.S. Cl.
CPC ....... *H04B 10/293* (2013.01); *H04B 10/2935* (2013.01); *H04J 14/0221* (2013.01); *H04J 14/0275* (2013.01)

(58) Field of Classification Search
USPC ........ 398/26, 27, 28, 29, 25, 30, 31, 32, 33, 398/34, 38, 147, 158, 159, 160, 79, 94
See application file for complete search history.

(56) References Cited

U.S. PATENT DOCUMENTS

| | | | | |
|---|---|---|---|---|
| 8,615,167 | B2* | 12/2013 | Sugaya | H04B 10/2935 398/26 |
| 8,909,041 | B2* | 12/2014 | Ye | H04B 10/07953 398/147 |
| 2002/0163683 | A1 | 11/2002 | Antoniades et al. | |
| 2003/0076578 | A1 | 4/2003 | Goto et al. | |
| 2004/0037564 | A1 | 2/2004 | Halevi et al. | |
| 2004/0130778 | A1 | 7/2004 | Smith et al. | |

OTHER PUBLICATIONS

Bosco, G. et al. "Performance prediction for WDM PM-QPSK transmission over uncompensated links" Proceedings of 2011 OFC/NFOEC, Mar. 6-10, 2011, Los Angeles, CA, IEEE, pp. 1-3, ISBN: 978-1-4577-0213-6.

Vacondio, F. et al. "On nonlinear distortions of highly dispersive optical coherent systems" Optics Express, vol. 20, No. 2, Jan. 16, 2012, pp. 1-11.

PCT International Search Report, mailed Apr. 2, 2013, in connection with International Application No. PCT/EP2012/065258, all pages.

\* cited by examiner

30 for each section, determine a respective optimal
optical channel power, $P_{OPT}$, as $$P_{OPT} = \left(\frac{n}{2a}\right)^{1/3}$$

where $n$ is the linear noise coefficient of the
section and $a$ is the nonlinear noise coefficient of
the section

32

↓ generate and transmit at least one control signal
arranged to cause a target optical channel power of
each section to be set the respective optimal
optical channel power

40 for each section, determine a respective optimal
optical channel power by calculating $$\frac{1}{SNR_{LIN}} + \frac{1}{SNR_{NL}}$$

for each of a plurality of different optical channel
powers and interpolate the calculated sum values
to identify the optical channel power for which the
sum has a minimum value

42

↓ generate and transmit at least one control signal
arranged to cause a target optical channel power of
each section to be set the respective optimal
optical channel power

METHOD OF OPTIMIZING OPTICAL SIGNAL QUALITY IN AN OPTICAL COMMUNICATIONS LINK, OPTICAL NETWORK ELEMENT AND OPTICAL COMMUNICATIONS LINK

TECHNICAL FIELD

The invention relates to a method of optimizing optical signal quality in an optical communications link. The invention further relates to an optical network element for an optical communications link and an optical communications link comprising the optical network element.

BACKGROUND

Wavelength division multiplexed, WDM, optical communication systems utilising coherent detection are attractive for their capability to recover linear impairments like chromatic dispersion and polarization mode dispersion that can be effectively mitigated by coherent detection and subsequent digital signal processing. A WDM optical signal is degraded by optical noise accumulation and impairments during propagation. Amplified spontaneous emission, ASE, noise accumulation is unavoidably related to the optical amplification, performed via erbium-doped fibre amplifiers, EDFA, or Raman amplifiers, which the WDM optical signal undergoes.

In existing systems, to optimise optical signal transmission quality the optical signal launch power is usually set to maximize the optical signal-to-noise ratio, OSNR, whilst keeping nonlinearities under a preselected tolerable threshold. G. Bosco et al, "Performance prediction for WDM PM-QPSK transmission over uncompensated links", in Proc. OFC 2011, paper OTh07 (2011) report that the variance of the nonlinear noise for a given transmission link is well approximated as $AP^3$ where P is the channel power and A is a constant which depends on system parameters and can be obtained numerically or analytically. The performance of the system can therefore be characterized by a "total" signal to noise ratio, which can be written as $$1/SNR = 1/SNR_{lin} + 1/SNR_{NL} \quad \text{Equation 1}$$

Where $1/SNR_{lin}$ is the inverse of the linear noise limited by ASE and implementation penalty. It can be further modelled as:

$$1/SNR_{lin} = 1/SNR_{ASE} + K_{TRX} \quad \text{Equation 2}$$

as reported by Vacondio et al, "On nonlinear distortions of highly dispersive optical coherent systems", Optics Express, January 2012, vol. 20, no. 27. The first term can be obtained from known span losses, launch powers and amplifier noise figures, and $K_{TRX}$ is a parameter that models the practical implementation of the transmitter, the receiver and the filter chain of the link. $K_{TRX}$ is known to the equipment manufacturer and the lower its value the better (it is 0 for an interface matching the ASE-limited performance). The second term consists of the nonlinear noise variance divided by the channel power, and has a slope of about −2 dB/dB with respect to the channel power.

A common approach to maximising optical signal transmission quality in coherent optical transmission systems is to simulate the effective Q factor (the bit error rate, BER, expressed through the inverse of the erfc( ) function) as a function of the launch channel power, and find the launch channel power for which the maximum Q is achieved for the system. An advantage of this solution is that is can be performed before the real system is deployed. A disadvantage is the large computational effort that is required to run the simulation of the propagation and detection of the optical signal.

SUMMARY

It is an object to provide an improved method of optimizing optical signal quality in an optical communications link. It is a further object to provide an improved optical network element for an optical communications link. It is a further object to provide an improved optical communications link.

A first aspect of the invention provides a method of optimizing optical signal quality in an optical communications link comprising a plurality of sections each comprising optical amplification apparatus and an optical fibre span. The method comprises, for each section, determining a respective optimal optical channel power which minimizes a sum of an indication of a respective linear optical noise and an indication of a respective nonlinear optical noise. The method further comprises generating and transmitting at least one control signal arranged to cause a target optical channel power of each section to be set to the respective optimal optical channel power.

The method may be used to determine an optimal set of channel powers for each section, and thus for each optical amplification apparatus, rather than a common channel power (the launch power) for all sections. The method may therefore enable a higher Q factor to be achieved for a communications link than is achievable by maximising Q simply as a function of the launch channel power. The method may also enable optical signal quality to be maximised where the linear and nonlinear noises are different for each section. By optimising the optical signal quality the optical reach of the optical signal may be optimised and the number of signal regenerators may be minimised—a 1 dB improvement in Q factor corresponds to a 25% increase in optical reach. Optimising the optical signal quality may also increase the system margin of the communications link, which may enable larger tolerances in component specifications and spectral management to be accommodated.

In an embodiment, the optical communications link further comprises a further optical amplification apparatus following the plurality of sections. For each section, the respective nonlinear optical noise comprises that generated at an input end of the optical fibre span and the respective linear optical noise comprises that generated at an output end of the optical fibre span. The indication of the linear optical noise is the inverse of the signal to noise ratio, SNR, of the linear optical noise and the indication of the nonlinear optical noise is the inverse of the SNR of the nonlinear optical noise. This may enable $K_{TRX}$ to be neglected.

In an embodiment, each optical amplification apparatus comprises an optical amplifier. For each section, the respective nonlinear optical noise comprises that generated in the optical fibre span after the respective optical amplifier and the respective linear optical noise comprises that generated at the optical amplifier of the subsequent section. The indication of the linear optical noise is the inverse of the signal to noise ratio, SNR, of the linear optical noise and the indication of the nonlinear optical noise is the inverse of the SNR of the nonlinear optical noise In an embodiment, each optical amplifier is an erbium doped fibre amplifier. The method may thus be used with optical communications links which only utilise EDFAs.

In an embodiment, each optical amplification apparatus comprises an optical pump source configured to deliver a Raman pump signal into the optical fibre span. For each section, the respective nonlinear optical noise comprises that generated at an input end of the optical fibre span and the respective linear optical noise comprises that generated at one of an output end of the optical fibre span and after the optical fibre span. The indication of the linear optical noise is the inverse of the signal to noise ratio, SNR, of the linear optical noise and the indication of the nonlinear optical noise is the inverse of the SNR of the nonlinear optical noise. The method may be used with optical communications links which only use Raman amplification or which use a combination of EDFAs and Raman amplification. Using both EDFAs and Raman amplification may further improve transmission performance of the communications link by enabling Raman amplification to be applied to more lossy fibre spans.

In an embodiment, the optimal optical channel power is the optical channel power for which the inverse of the SNR of the linear noise is equal to twice the inverse of the SNR of the nonlinear noise.

In an embodiment, where optical amplifiers are used, the optimal optical channel power, $P_{OPT}$, of a section is determined as $$P_{OPT} = \left(\frac{n}{2a}\right)^{1/3},$$

where n is the linear noise coefficient of the section and a is the nonlinear noise coefficient of the section. The method may enable the optimal optical channel power for each section to be determined simply from knowing the linear and nonlinear noise coefficients of the section. The method may therefore be used in relation to optical communication links comprising fibre spans of different fibre types, and thus having different nonlinear noise coefficients. The optical channel power may therefore be reduced for fibre spans having a lower nonlinear tolerance.

In an embodiment, at least one fibre span is dispersion compensating fibre. The method may therefore be used to optimise the optical channel power for optical communications links comprising fibre-based dispersion compensation modules.

In an embodiment, the optimal optical channel power is determined by calculating the sum of the inverse of the SNR of the linear optical noise and the inverse of the SNR of the nonlinear optical noise for each of a plurality of different optical channel powers and interpolating the calculated sum values to identify the optical channel power for which the sum has a minimum value. The method may enable the optimal optical channel power for each section to be determined from measured or simulated SNRs.

In an embodiment, the optimal optical channel power is determined by calculating the sum of the inverse of the SNR of the linear optical noise and the inverse of the SNR of the nonlinear optical noise for each of a plurality of different optical channel powers and identifying from the calculated sum values the optical channel power for which the sum has a minimum value. The method may enable the optimal optical channel power for each section to be determined from measured or simulated SNRs.

In an embodiment, the method comprises determining whether each optical amplification apparatus has a noise figure which depends on its optical gain in a known way or an unknown way or has a noise figure which is independent of its optical gain. If the noise figure depends on the optical gain in a known way, the method comprises determining the respective optimal optical channel power of each section substantially in parallel or in series forwards, starting with the first section and finishing with the last section. If the noise figure depends on the optical gain in an unknown way or is independent of its optical gain, the method comprises determining the respective optimal optical channel power of each section recursively backwards, starting with the last section and finishing with the first section. The method may therefore be optimized according to the gain dependence of the noise figure and whether the noise figure is known.

In an embodiment, the method comprises setting a target optical channel power to be output at a receiving end of the optical communications link and then determining the respective optimal optical channel power of each section recursively backwards from the receiving end in accordance with the target optical channel power. The method may ensure that the target optical channel power required to meet demultiplexer and optical receiver parameters is delivered at the receiving end of the communications link.

In an embodiment, where optical amplifiers are used, the linear noise coefficient, $n_i$, of a section, i, is calculated as $n_i = L_i \cdot NF_{i+1} \cdot h \cdot f \cdot B_o$, where $L_i$ is the loss of the optical fibre span of the section, $NF_{i+1}$ is the noise figure of the optical amplifier of the subsequent section, h is Planck's constant, f is the frequency of the optical signal and $B_o$ is a reference optical bandwidth over which the optical channel power is measured.

In an embodiment, the method comprises including a linear optical noise of the optical amplification apparatus of the first section.

In an embodiment, the optical communications link is a coherent optical communications link.

In an embodiment, the optical communications link is a dense wavelength division multiplexed, DWDM, optical communications link.

In an embodiment, the linear optical noise is amplified spontaneous emission, ASE, noise. ASE noise can be obtained from known span losses, launch powers and amplifier noise figures.

In an embodiment, the at least one control signal is transmitted on an optical supervisory channel of the optical communications link. The method may therefore utilise existing control signalling infrastructure.

In an embodiment, the method is implemented during configuration of the optical communications link. The method may be used to provide an optimal "set and forget" optical channel power set.

In an embodiment, the method is implemented periodically following configuration of the optical communications link. The method may be used to continuously optimise the performance of the optical communications link, which may enable higher channel powers to be automatically implemented in response to an increase in loss in one or more sections of the link, for example following a fibre repair or link re-routing.

In an embodiment, the method is implemented following a change in the optical communications link. The method may be used to reset the channel powers following an exceptional event, such as a change in fibre losses due fibre repair or link re-routing.

A second aspect of the invention provides an optical network element for an optical communications link. The optical communications link comprises a plurality of sections each comprising an optical amplification apparatus and an optical fibre span. The optical network element comprises an optical channel signal output and a controller. The optical channel signal output is configured to output an optical channel signal to the optical communications link. The controller is configured to determine a respective optimal optical channel power for each section. The optimal optical channel power minimizes a sum of an indication of a linear optical noise of the section and an indication of a nonlinear optical noise of the section. The controller is configured to generate at least one control signal arranged to cause a target optical channel power of each section to be set to the respective optimal optical channel power.

The controller may determine an optimal set of channel powers for each section of the optical communications link, and thus for each optical amplification apparatus, rather than a common channel power (the launch power) for all sections. A higher Q factor may therefore be achieved for a communications link than is achievable by maximising Q simply as a function of the launch channel power. Optical signal quality may to be maximised where the linear and nonlinear noises are different for each section. By optimising the optical signal quality the optical reach of the optical signal may be optimised and the number of signal regenerators in the link may be minimised—a 1 dB improvement in Q factor corresponds to a 25% increase in optical reach. Optimising the optical signal quality may also increase the system margin of the communications link, which may enable larger tolerances in component specifications and spectral management to be accommodated.

In an embodiment, the optical communications link further comprises a further optical amplification apparatus following the plurality of sections. For each section, the respective nonlinear optical noise comprises that generated at an input end of the optical fibre span and the respective linear optical noise comprises that generated at an output end of the optical fibre span. The indication of the linear optical noise is the inverse of the signal to noise ratio, SNR, of the linear optical noise and the indication of the nonlinear optical noise is the inverse of the SNR of the nonlinear optical noise. This may enable $K_{TRX}$ to be neglected.

In an embodiment, each optical amplification apparatus comprises an optical amplifier. For each section, the respective nonlinear optical noise comprises that generated in the optical fibre span after the respective optical amplifier and the respective linear optical noise comprises that generated at the optical amplifier of the subsequent section. The indication of the linear optical noise is the inverse of the signal to noise ratio, SNR, of the linear optical noise and the indication of the nonlinear optical noise is the inverse of the SNR of the nonlinear optical noise In an embodiment, each optical amplifier is an erbium doped fibre amplifier.

In an embodiment, each optical amplification apparatus comprises an optical pump source configured to deliver a Raman pump signal into the optical fibre span. For each section, the respective nonlinear optical noise comprises that generated at an input end of the optical fibre span and the respective linear optical noise comprises that generated at one of an output end of the optical fibre span and after the optical fibre span. The indication of the linear optical noise is the inverse of the signal to noise ratio, SNR, of the linear optical noise and the indication of the nonlinear optical noise is the inverse of the SNR of the nonlinear optical noise. The optical communications link may therefore comprise only Raman amplification or may comprise a combination of EDFAs and Raman amplification. Using both EDFAs and Raman amplification may further improve transmission performance of the communications link by enabling Raman amplification to be applied to more lossy fibre spans.

In an embodiment, the optimal optical channel power is the optical channel power for which the inverse of the SNR of the linear noise is equal to twice the inverse of the SNR of the nonlinear noise.

In an embodiment, where optical amplifiers are used, the controller is configured to determine the optimal optical channel power, $P_{OPT}$, of a section as $$P_{OPT} = \left(\frac{n}{2a}\right)^{1/3},$$

where n is the linear noise coefficient of the section and a is the nonlinear noise coefficient of the section. This may enable the optimal optical channel power for each section to be determined simply from knowing the linear and nonlinear noise coefficients of the section.

In an embodiment, the controller is configured to determine the optimal optical channel power by calculating the sum of the inverse of the SNR of the linear optical noise and the inverse of the SNR of the nonlinear optical noise for each of a plurality of different optical channel powers and interpolating the calculated sum values to identify the optical channel power for which the sum has a minimum value. This may enable the optimal optical channel power for each section to be determined from measured or simulated SNRs.

In an embodiment, the controller is configured to determine the optimal optical channel power by calculating the sum of the inverse of the SNR of the linear optical noise and the inverse of the SNR of the nonlinear optical noise for each of a plurality of different optical channel powers and identifying from the calculated sum values the optical channel power for which the sum has a minimum value. This may enable the optimal optical channel power for each section to be determined from measured or simulated SNRs.

In an embodiment, the controller is configured to determine whether each optical amplification apparatus has a noise figure which depends on its optical gain in a known way or an unknown way or has a noise figure which is independent of its optical gain. The controller is configured, if the noise figure depends on the optical gain in a known way, to determine the respective optimal optical channel power of each section substantially in parallel or in series forwards, starting with the first section and finishing with the last section. The controller is configured, if the noise figure depends on the optical gain in an unknown way or is independent of its optical gain, to determine the respective optimal optical channel power of each section recursively backwards, starting with the last section and finishing with the first section. Operation of the controller may therefore be optimized according to the gain dependence of the noise figure and whether the noise figure is known.

In an embodiment, the controller is configured to obtain a target optical channel power to be output at a receiving end of the optical communications link and to subsequently determine the respective optimal optical channel power of each section recursively backwards from the receiving end in accordance with the target optical channel power. This may ensure that the target optical channel power required to meet demultiplexer and optical receiver parameters is delivered at the receiving end of the communications link.

In an embodiment, where optical amplifiers are used, the linear noise coefficient, $n_i$, of a section, i, is calculated as $n_i = L_i \cdot NF_{i+1} \cdot h \cdot f \cdot B_o$, where $L_i$ is the loss of the optical fibre span of the section, $NF_{i+1}$ is the noise figure of the optical amplifier of the subsequent section, h is Planck's constant, f is the frequency of the optical signal and $B_o$ is a reference optical bandwidth over which the optical channel power is measured.

In an embodiment, the controller is configured to include a linear optical noise of the optical amplifier of the first section.

In an embodiment, the optical communications link is a coherent optical communications link.

In an embodiment, the optical communications link is a dense wavelength division multiplexed, DWDM, optical communications link.

In an embodiment, the linear optical noise is amplified spontaneous emission, ASE, noise of the respective optical amplifier. ASE noise can be obtained from known span losses, launch powers and amplifier noise figures.

In an embodiment, the controller is configured to generate the at least one control signal for transmission on an optical supervisory channel of the optical communications link. The optical network element may therefore utilise existing control signalling infrastructure.

In an embodiment, the controller is configured to determine the respective optimal optical channel power for each section and to generate the at least one control signal during configuration of the optical communications link. The controller may be operated to provide an optimal "set and forget" optical channel power set.

In an embodiment, the controller is configured to determine the respective optimal optical channel power for each section and to generate the at least one control signal periodically following configuration of the optical communications link. The controller may be operated to continuously optimise the performance of the optical communications link, which may enable higher channel powers to be automatically implemented in response to an increase in loss in one or more sections of the link, for example following a fibre repair or link re-routing.

In an embodiment, the controller is configured to determine the respective optimal optical channel power for each section and to generate the at least one control signal following a change in the optical communications link. The controller may be operated to reset the link following an exceptional event, such as a change in fibre losses due fibre repair or link re-routing.

A third aspect of the invention provides an optical communications link comprising a plurality of sections each comprising an optical amplification apparatus and an optical fibre span and an optical network element. The optical network element comprises an optical channel signal output and a controller. The optical channel signal output is configured to output an optical channel signal to the optical communications link. The controller is configured to determine a respective optimal optical channel power for each section. The optimal optical channel power minimizes a sum of an indication of a linear optical noise of the section and an indication of a nonlinear optical noise of the section. The controller is configured to generate at least one control signal arranged to cause a target optical channel power of each section to be set to the respective optimal optical channel power.

The controller may determine an optimal set of channel powers for each section of the optical communications link, and thus for each optical amplification apparatus, rather than a common channel power (the launch power) for all sections. A higher Q factor may therefore be achieved for the communications link than is achievable by maximising Q simply as a function of the launch channel power. Optical signal quality may to be maximised where the linear and nonlinear noises are different for each section. By optimising the optical signal quality the optical reach of the optical signal may be optimised and the number of signal regenerators in the link may be minimised—a 1 dB improvement in Q factor corresponds to a 25% increase in optical reach. Optimising the optical signal quality may also increase the system margin of the communications link, which may enable larger tolerances in component specifications and spectral management to be accommodated.

In an embodiment, the optical communications link further comprises a further optical amplification apparatus following the plurality of sections. For each section, the respective nonlinear optical noise comprises that generated at an input end of the optical fibre span and the respective linear optical noise comprises that generated at an output end of the optical fibre span. The indication of the linear optical noise is the inverse of the signal to noise ratio, SNR, of the linear optical noise and the indication of the nonlinear optical noise is the inverse of the SNR of the nonlinear optical noise. This may enable $K_{TRX}$ to be neglected.

In an embodiment, each optical amplification apparatus comprises an optical amplifier. For each section, the respective nonlinear optical noise comprises that generated in the optical fibre span after the respective optical amplifier and the respective linear optical noise comprises that generated at the optical amplifier of the subsequent section. The indication of the linear optical noise is the inverse of the signal to noise ratio, SNR, of the linear optical noise and the indication of the nonlinear optical noise is the inverse of the SNR of the nonlinear optical noise In an embodiment, each optical amplifier is an erbium doped fibre amplifier.

In an embodiment, each optical amplification apparatus comprises an optical pump source configured to deliver a Raman pump signal into the optical fibre span. For each section, the respective nonlinear optical noise comprises that generated at an input end of the optical fibre span and the respective linear optical noise comprises that generated at one of an output end of the optical fibre span and after the optical fibre span. The indication of the linear optical noise is the inverse of the signal to noise ratio, SNR, of the linear optical noise and the indication of the nonlinear optical noise is the inverse of the SNR of the nonlinear optical noise. The optical communications link may therefore comprise only Raman amplification or may comprise a combination of EDFAs and Raman amplification. Using both EDFAs and Raman amplification may further improve transmission performance of the communications link by enabling Raman amplification to be applied to more lossy fibre spans.

In an embodiment, the optimal optical channel power is the optical channel power for which the inverse of the SNR of the linear noise is equal to twice the inverse of the SNR of the nonlinear noise.

In an embodiment, where optical amplifiers are used, the controller is configured to determine the optimal optical channel power, $P_{OPT}$, of a section as $$P_{OPT} = \left(\frac{n}{2a}\right)^{1/3},$$

where n is the linear noise coefficient of the section and a is the nonlinear noise coefficient of the section. This may enable the optimal optical channel power for each section to be determined simply from knowing the linear and nonlinear noise coefficients of the section.

In an embodiment, the controller is configured to determine the optimal optical channel power by calculating the sum of the inverse of the SNR of the linear optical noise and the inverse of the SNR of the nonlinear optical noise for each of a plurality of different optical channel powers and interpolating the calculated sum values to identify the optical channel power for which the sum has a minimum value. This may enable the optimal optical channel power for each section to be determined from measured or simulated SNRs.

In an embodiment, the controller is configured to determine the optimal optical channel power by calculating the sum of the inverse of the SNR of the linear optical noise and the inverse of the SNR of the nonlinear optical noise for each of a plurality of different optical channel powers and identifying from the calculated sum values the optical channel power for which the sum has a minimum value. This may enable the optimal optical channel power for each section to be determined from measured or simulated SNRs.

In an embodiment, the controller is configured to determine whether each optical amplification apparatus has a noise figure which depends on its optical gain in a known way or an unknown way or has a noise figure which is independent of its optical gain. The controller is configured, if the noise figure depends on the optical gain in a known way, to determine the respective optimal optical channel power of each section substantially in parallel or in series forwards, starting with the first section and finishing with the last section. The controller is configured, if the noise figure depends on the optical gain in an unknown way or is independent of its optical gain, to determine the respective optimal optical channel power of each section recursively backwards, starting with the last section and finishing with the first section. Operation of the controller may therefore be optimized according to the gain dependence of the noise figure and whether the noise figure is known.

In an embodiment, the controller is configured to obtain a target optical channel power to be output at a receiving end of the optical communications link and to subsequently determine the respective optimal optical channel power of each section recursively backwards from the receiving end in accordance with the target optical channel power. This may ensure that the target optical channel power required to meet demultiplexer and optical receiver parameters is delivered at the receiving end of the communications link.

In an embodiment, where optical amplifiers are used, the linear noise coefficient, $n_i$, of a section, i, is calculated as $n_i = L_i \cdot NF_{i+1} \cdot h \cdot f \cdot B_o$, where $L_i$ is the loss of the optical fibre span of the section, $NF_{i+1}$ is the noise figure of the optical amplifier of the subsequent section, h is Planck's constant, f is the frequency of the optical signal and $B_o$ is a reference optical bandwidth over which the optical channel power is measured.

In an embodiment, the controller is configured to include a linear optical noise of the optical amplifier of the first section.

In an embodiment, the optical communications link is a coherent optical communications link.

In an embodiment, the optical communications link is a dense wavelength division multiplexed, DWDM, optical communications link.

In an embodiment, the linear optical noise is amplified spontaneous emission, ASE, noise of the respective optical amplifier. ASE noise can be obtained from known span losses, launch powers and amplifier noise figures.

In an embodiment, the controller is configured to generate the at least one control signal for transmission on an optical supervisory channel of the optical communications link. The optical network element may therefore utilise existing control signalling infrastructure.

In an embodiment, the controller is configured to determine the respective optimal optical channel power for each section and to generate the at least one control signal during configuration of the optical communications link. The controller may be operated to provide an optimal "set and forget" optical channel power set.

In an embodiment, the controller is configured to determine the respective optimal optical channel power for each section and to generate the at least one control signal periodically following configuration of the optical communications link. The controller may be operated to continuously optimise the performance of the optical communications link, which may enable higher channel powers to be automatically implemented in response to an increase in loss in one or more sections of the link, for example following a fibre repair or link re-routing.

In an embodiment, the controller is configured to determine the respective optimal optical channel power for each section and to generate the at least one control signal following a change in the optical communications link. The controller may be operated to reset the link following an exceptional event, such as a change in fibre losses due fibre repair or link re-routing.

A fourth aspect of the invention provides a data carrier having computer readable instructions embodied therein. The said computer readable instructions are for providing access to resources available on a processor. The computer readable instructions comprise instructions to cause the processor to perform any of the above steps of the method of optimizing optical signal quality in an optical communications link.

In an embodiment, the data carrier is a non-transitory data carrier.

Embodiments of the invention will now be described, by way of example only, with reference to the accompanying drawings.

BRIEF DESCRIPTION OF THE DRAWINGS

FIG. 3 shows the steps of a method according to a third embodiment of the invention of optimizing optical signal quality in an optical communications link comprising a plurality of sections each comprising an optical amplifier and an optical fibre span;

FIG. 4 shows the steps of a method according to a fourth embodiment of the invention of optimizing optical signal quality in an optical communications link comprising a plurality of sections each comprising an optical amplifier and an optical fibre span;

DETAILED DESCRIPTION

Figure 1:
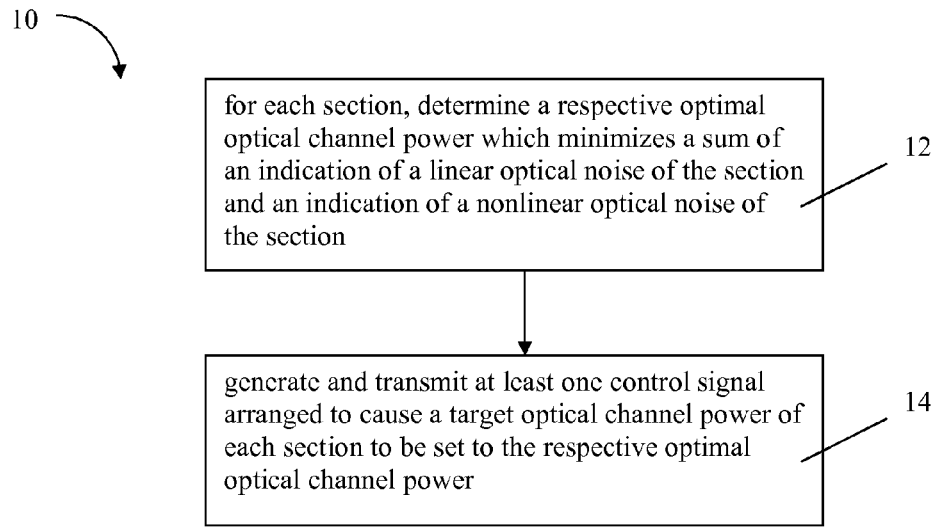
FIG. 1 shows the steps of a method according to a first embodiment of the invention of optimizing optical signal quality in an optical communications link comprising a plurality of sections each comprising an optical amplifier and an optical fibre span.

Referring to FIG. 1, a first embodiment of the invention provides a method 10 of optimizing optical signal quality in an optical communications link. The link comprises a plurality of sections each comprising an optical amplification apparatus and an optical fibre span.

The method 10 comprises, for each section, determining a respective optimal optical channel power which minimizes a sum of an indication of a linear optical noise and an indication of a nonlinear optical noise 12. The method 10 comprises generating and transmitting at least one control signal arranged to cause a target optical channel power of each section to be set to the respective optimal optical channel power 14.

Figure 2:
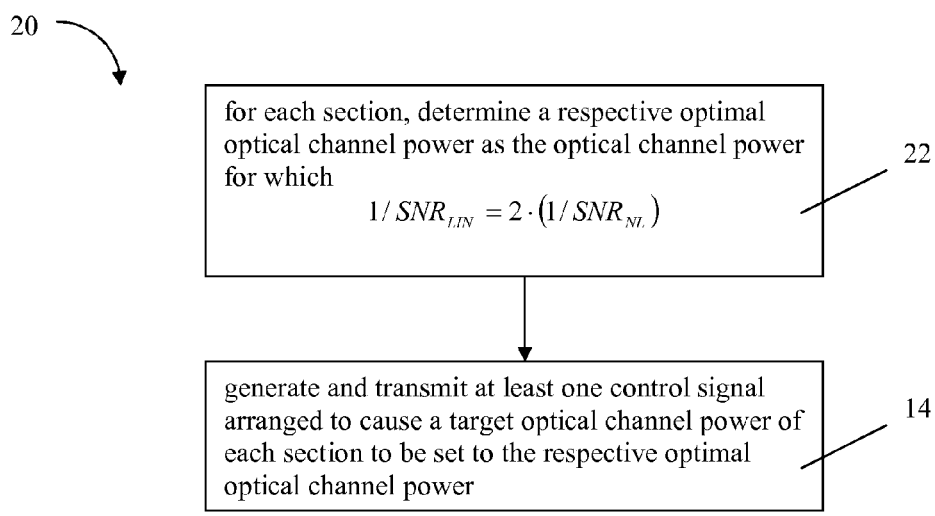
FIG. 2 shows the steps of a method according to a second embodiment of the invention of optimizing optical signal quality in an optical communications link comprising a plurality of sections each comprising an optical amplifier and an optical fibre span.

Referring to FIG. 2, a second embodiment of the invention provides a method 20 of optimizing optical signal quality in an optical communications link, which is similar to the method 10 of FIG. 1, with the following modifications. The same reference numbers are retained for corresponding steps.

In this embodiment, the optical communications link further comprises a further optical amplification apparatus following the plurality of sections.

The nonlinear optical noise of a section comprises that generated in the optical fibre span at an input end of the optical fibre span, where the optical power is high enough to induce the Kerr effect. The linear optical noise comprises that generated at an output end of the optical fibre span. $K_{TRX}$ of Equation 2 does not enter into play now and can in general be neglected.

The indication of the linear optical noise is the inverse of the signal to noise ratio, SNR, of the linear optical noise of the section. The indication of the nonlinear optical noise is the inverse of the SNR of the nonlinear optical noise of the section.

The optimal optical channel power is the optical channel power for which:

$$1/SNR_{LIN}=2 \cdot (1/SNR_{NL})$$ Equation 3

The optimal optical channel power for each section is determined as the optical channel power for which Equation 3 holds.

Referring to FIG. 3, a third embodiment of the invention provides a method 30 of optimizing optical signal quality in an optical communications link, which is similar to the method 10 of FIG. 1, with the following modifications. The same reference numbers are retained for corresponding steps.

The method 30 of this embodiment applies where each optical amplification apparatus comprises an optical amplifier. The method 30 models an optical communications link as comprising N sections, one for each i-th fibre span, where the nonlinear noise, $SNR_{NL}$, comprises that generated in the optical fibre at the input end of the fibre, which is taken to be after the i-th amplifier, and the linear noise, $SNR_{LIN}$, comprises that generated at an output end of the fibre, which is taken to be at the (i+1)-th amplifier.

In this embodiment, the linear noise is ASE noise. As reported by Vacondio et al (ibid), for one section:

$$1/SNR_{NL}=aP^2$$

and $$SNR_{ASE}=P/n$$

Equation 1 can therefore be re-written as:

$$1/SNR=n/P+aP^2$$ Equation 4

The minimum noise as a function of channel power can be found by differentiating Equation 4:

$$\frac{\partial}{\partial p}(1/SNR) = \frac{-n+2ap^3}{p}$$ Equation 5

Which is minimal (best case) where the channel power, $P_{OPT}$, is $$P_{OPT} = \left(\frac{n}{2a}\right)^{1/3}$$ Equaton 6

In this condition, we get:

$$1/SNR_{ASE}=2 \cdot (1/SNR_{NL})$$

Therefore, for each section, knowing the nonlinear noise coefficient, a, and the linear noise coefficient, n, the optimal optical channel power may be found and the optical performance of the communications link may be optimised.

For each ith section, n is the product between the (i+1)th amplifier gain and the (i+1)th amplifer noise figure which, in turn, is a known function of its gain. In more detail, $1/SNR_{ASE}$ of fibre span N is $$1/SNR_{lin} = \frac{G_{i+1} \cdot NF \cdot h \cdot f \cdot B_o}{P_{i+1}}$$ Equation 7

$$= \frac{L_i \cdot NF_{i+1} \cdot h \cdot f \cdot B_o}{P_i}$$

$$= \frac{n_i}{P_i}$$

so the linear noise coefficient of the ith section, $n_i$, is $$n_i = L_i \cdot NF_{i+1} \cdot h \cdot f \cdot B_o$$ Equation 8 where $L_i$ is the loss of the i-th fibre span, $NF_{i+1}$ is the noise figure of the (i+1)-th amplifier, i.e. the amplifier after the i-th fibre span, h is Planck's constant, f is the frequency of the optical signal and $B_o$ the optical receiver bandwidth. The receiver bandwidth may be a reference bandwidth of 12.5 GHz, which corresponds to 0.1 nm at 1550 nm (optical SNR is typically reported as the optical SNR in 0.1 nm), as long as the nonlinear noise coefficient a is scaled to the same bandwidth.

The optimal optical channel power, $P_{OPT}$, of a section is therefore determined as $$P_{OPT} = \left(\frac{n}{2a}\right)^{1/3},$$

where n is the linear noise coefficient of the section and a is the nonlinear noise coefficient of the section 32.

Referring to FIG. 4, a fourth embodiment of the invention provides a method 40 of optimizing optical signal quality in an optical communications link, which is similar to the method 10 of FIG. 1, with the following modifications. The same reference numbers are retained for corresponding steps.

This embodiment may be applied where each optical amplification apparatus comprises an optical amplifier or an optical pump source configured to deliver a Raman pump signal into the respective optical fibre span, or a combination of both.

In this embodiment, for each section, the respective optimal optical channel power is determined by calculating the total noise FIG.

$$1/SNR_{LIN} + 1/SNR_{NL}$$

for each of a plurality of different optical channel powers. The calculated sum values are then interpolated to identify the optical channel power for which the sum has a minimum value 42. The method of this embodiment therefore avoids the need to differentiate equation 4, which may be advantageous if there is a more complex relationship between nonlinear noise and linear noise and channel power than is reported by Vacondio et al.

Figure 5:
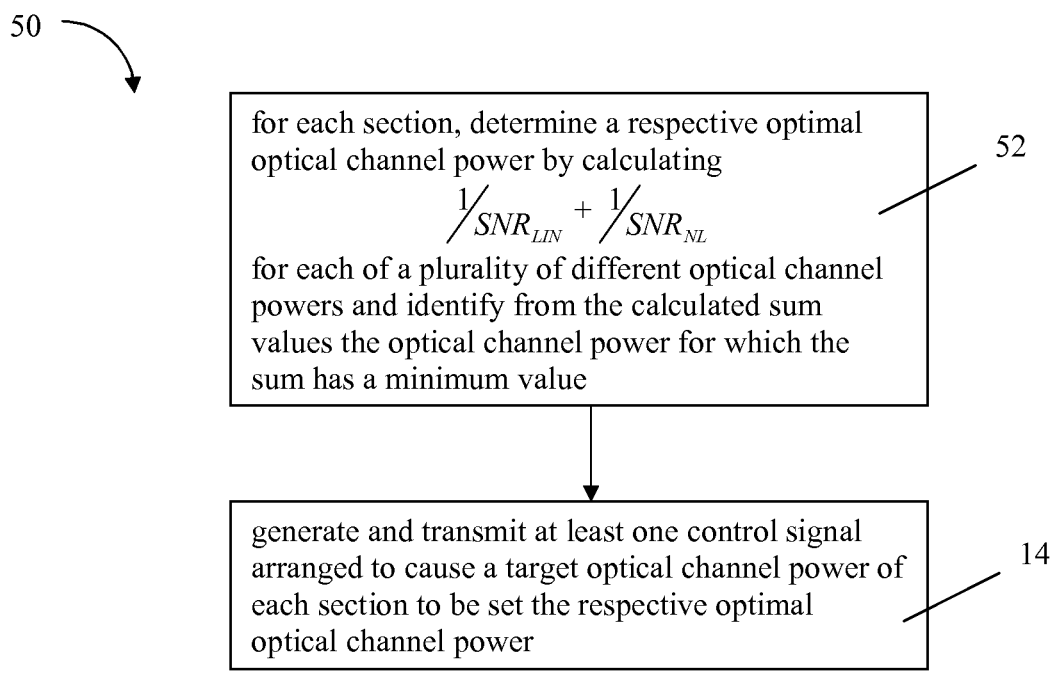
FIG. 5 shows the steps of a method according to a fifth embodiment of the invention of optimizing optical signal quality in an optical communications link comprising a plurality of sections each comprising an optical amplifier and an optical fibre span.

Referring to FIG. 5, a fifth embodiment of the invention provides a method 50 of optimizing optical signal quality in an optical communications link, which is similar to the method 40 of FIG. 4, with the following modifications. The same reference numbers are retained for corresponding steps.

This embodiment may similarly be applied where each optical amplification apparatus comprises an optical amplifier or an optical pump source configured to deliver a Raman pump signal into the respective optical fibre span, or a combination of both.

In this embodiment, the method comprises identifying from the calculated sum values the optical channel power for which the sum has a minimum value 52.

Figure 6:
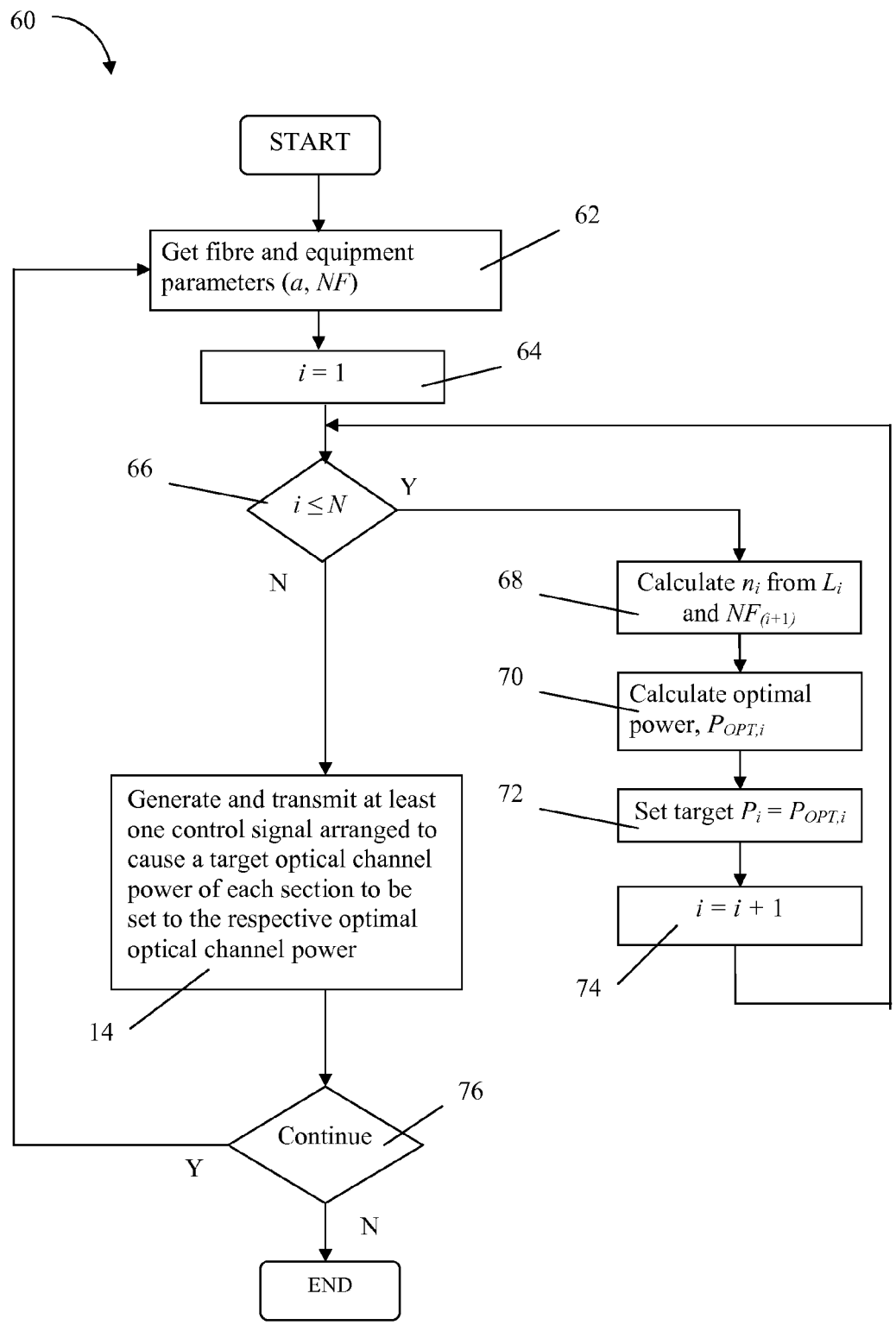
FIG. 6 shows the steps of a method according to a sixth embodiment of the invention of optimizing optical signal quality in an optical communications link comprising a plurality of sections each comprising an optical amplifier and an optical fibre span.

Referring to FIG. 6, a sixth embodiment of the invention provides a method 60 of optimizing optical signal quality in an optical communications link, which is similar to the method 10 of FIG. 1, with the following modifications. The same reference numbers are retained for corresponding steps.

This embodiment may be applied where each optical amplification apparatus comprises an optical amplifier or an optical pump source configured to deliver a Raman pump signal into the respective optical fibre span, or a combination of both.

This embodiment of the invention is applicable where it has been determined that each optical amplification apparatus in the optical communications link has a constant noise figure, i.e. the noise figure is independent of gain or the amplification apparatus has a fixed gain. In this situation the optimal optical channel power can be found for each section in any order, and in particular one after the other, moving from the transmitting end of the link to the receiving end of the link (the "forwards" direction), or for all sections simultaneously.

This embodiment is for the forwards direction and is described, for simplicity, in relation to an optical communications link which comprises optical amplifiers only.

The method 60 comprises getting the fibre and equipment parameters of the communications link 62 having N sections, namely the nonlinear noise coefficient, a, and the noise figure, NF. The first section, i=1, is then selected 64 and a check made that i≤N 66. If true, Y, the method proceeds to calculate $n_i$ from $L_i$ and $NF_{(i+1)}$ for the first section 68, using Equation 8 above, and to calculate the optimal optical channel power, $P_{OPT,\ i}$, for the first section 70. The target optical channel power of the first section, $P_i$, is then set to $P_{OPT,\ i}$ 72, and i is incremented by one 74, to move the calculation to the next section. The checking 66 and calculation loop 68, 70, 72, 74 is repeated for each section until i=N.

Once the optimal optical channel power, $P_{OPT}$, has been determined for each section the method moves on to generate and transmit at least one control signal arranged to cause a target optical channel power of each section to be set to the respective optimal optical channel power 14. It will be appreciated that a single control signal relating to all of the sections may be generated and transmitted, or a number of control signals may be generated and transmitted, each relating to one or more sections.

If the method 60 is being run in a "set and forget" manner, during configuration of a communications link, the method does not continue 76. If the method 60 is being run periodically, the method will continue 76 by recommencing at the step of getting the fibre and equipment parameters 62.

Figure 7:
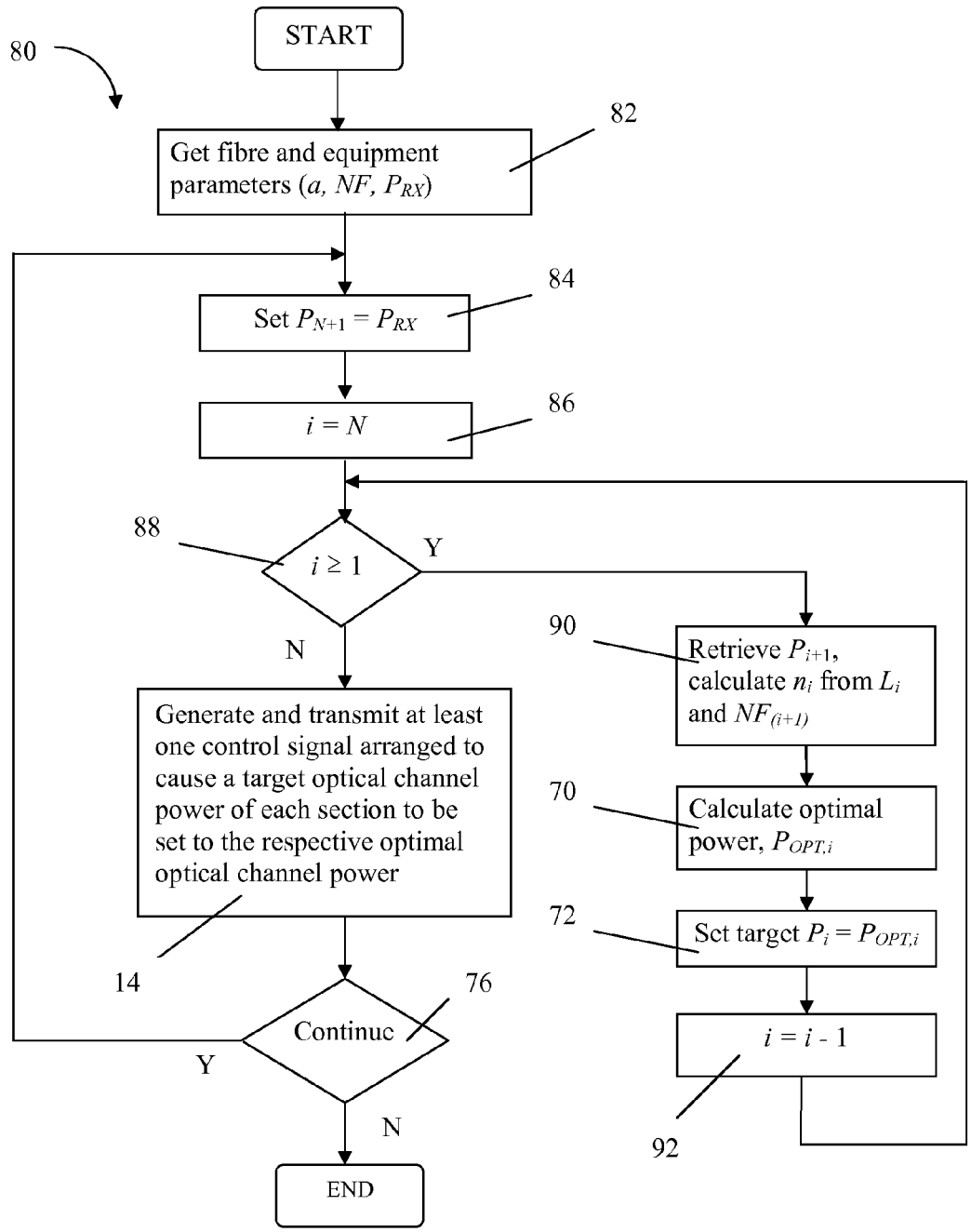
FIG. 7 shows the steps of a method according to a seventh embodiment of the invention of optimizing optical signal quality in an optical communications link comprising a plurality of sections each comprising an optical amplifier and an optical fibre span.

Referring to FIG. 7, a seventh embodiment of the invention provides a method 80 of optimizing optical signal quality in an optical communications link, which is similar to the method 60 of FIG. 6, with the following modifications. The same reference numbers are retained for corresponding steps.

This embodiment of the invention is applicable where it has been determined that each optical amplification apparatus in the optical communications link has noise figure which is gain dependent. The communications link has N sections and thus has N+1 optical amplification apparatus.

The method 80 is described, for simplicity, in relation to an optical communications link which comprises optical amplifiers only.

The method 80 comprises getting the fibre and equipment parameters of the communications link 82, namely the nonlinear noise coefficient, a, the noise figure, NF, and a target optical channel power, $P_{RX}$, to be output at the receiving end of the communications link. The target optical channel power, $P_{N+1}$, to be output from the last optical amplifier is set to $P_{RX}$ 84.

The last section, i=N, is then selected 84 and a check made that i≥1 86. If true, Y, the method proceeds to retrieve $P_{i+1}$ and to calculate $n_i$ from $L_i$ and $NF_{(i+1)}$ for the last section 90, using Equation 8 above. The optimal optical channel power, $P_{OPT,\ i}$, for the last section is then calculated 70. The target optical channel power of the last section, $P_i$, is then set to $P_{OPT,i}$ 72, and i is decreased by one 92, to move the calculation to the preceding section. The checking 88 and calculation loop 90, 70, 72, 92 is repeated for each section moving recursively backwards from the receiving end until i=0.

Determining the optimal optical channel power backwards provides an advantage during the design phase of an optical communications link that, with the varying channel powers, the selection of which amplifier to use in any location can now depend on both its output power and on the output power at the previous section, but the optimum channel power mostly depends only on the gain and noise figure at the next section. So fixing $P_{i+1}$ and then considering $P_i$ and the amplifier choice at section i+1 together simplifies the procedure.

Calculating the optimal optical channel power recursively backwards also allows the method 80 to be used with optical communications links having optical amplifiers which have embedded variable optical attenuators, VOAs, for gain flattening, and therefore have noise figures which increase as the gain decreases. The relationship between noise figure and gain should however be less than a dB per dB, so that the gain, G, multiplied by the noise figure is still an increasing function of the gain. In this situation $$NF_{i+1}=NF_{i+1}(G_{i+1}) \text{ where } G_{i+1}=P_{i+1}\cdot L_i/P_i$$

Equation 5 then becomes more complex, since n is not constant anymore but depends on $P_i$ via $NF_{i+1}$ and $G_{i+1}$. The equation for $P_{OPT,i}$, that is $\partial(1/SNR)/\partial P_i=0$, then becomes $$\frac{\partial(1/SNR)}{\partial P_i} = -\frac{n}{P_i^2} + \frac{1}{P_i}\frac{\partial n}{\partial P_i} + 2aP_i^2 = 0$$

$$\text{where } \frac{\partial n}{\partial P_i} = -\frac{L_i P_{i+1}}{P_i^2}\frac{n}{NF_{i+1}}\frac{dNF(G_{i+1})}{dG_{i+1}}$$

Figure 8:
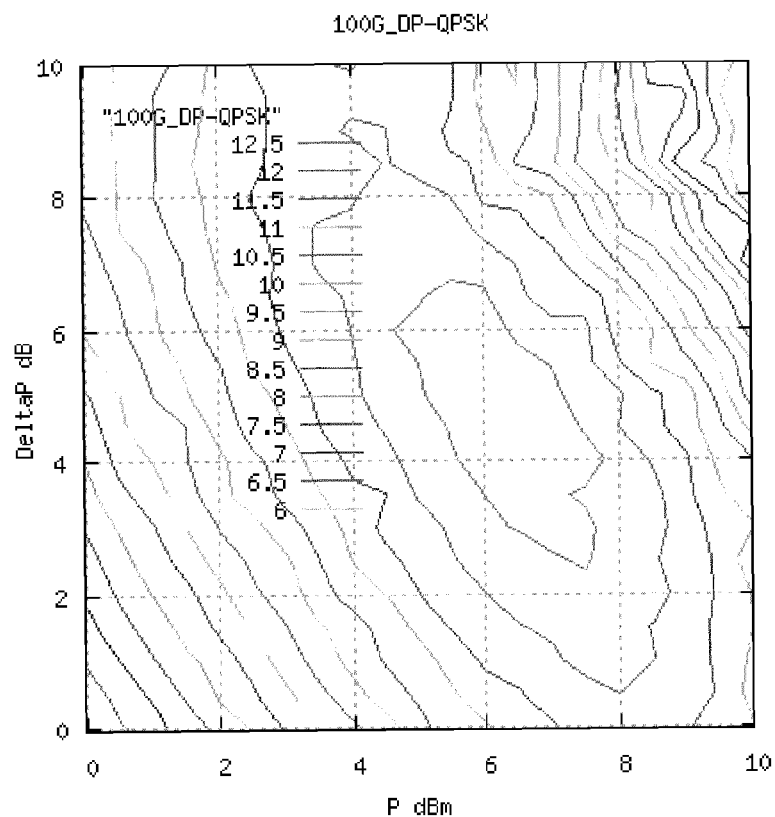
FIG. 8 shows a plot of $Q^2$ factor (dB) as a function of channel power, P (dBm), and Delta P (dB) for a simulated 50 GHz-spaced 6-channel 128 Gbit/s DP-QPSK coherent transmission over an optical link of 12 spans of G.652 fibre, with 11 spans of 21 dB loss and one span of 36 dB loss.

The method 80 has been simulated for a 50 GHz-spaced, 6-channel 128 Gbit/s dual polarisation quadrature phase shift keying, DP-QPSK, coherent transmission over an optical link of 12 spans of G.652 fibre, in which 11 spans have a span loss of 21 dB and one span has a span loss of 36 dB. FIG. 8 shows lines of constant $Q^2$ factor, in dB, as a function of the channel power P, dBm, (x-axis) and the extra power DeltaP, dB, that is applied to the amplifier preceding the 36 dB loss span (y-axis).

The case DeltaP=0 corresponds to the prior art, where all of the channel powers are the same. It can be seen from the graph that signal quality in case of DeltaP=0 is maximum for P=8 dBm/channel and leads to a best Q of 11.7 dB. It can also be seen that the best optical signal quality is obtained for a channel power of 6.5 dBm/channel with a DeltaP of 4 dB, which produces a Q of 12.7 dB, which is 1 dB higher than the result obtained with DeltaP=0, as in the prior art.

Figure 9:
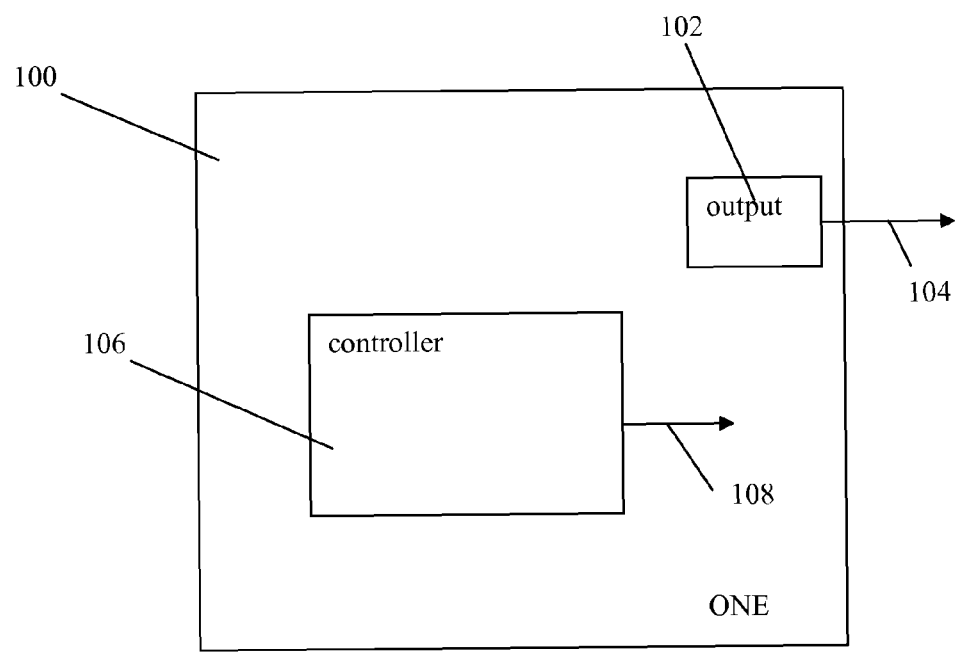
FIG. 9 is a schematic representation of an optical network element according to an eighth embodiment of the invention.

An optical network element, ONE, 100 according to an eighth embodiment of the invention is shown in FIG. 9. The ONE 100 is for an optical communications link comprising a plurality of sections each comprising an optical amplification apparatus and an optical fibre span.

The ONE 100 comprises an optical channel signal output 102 and a controller 106.

The output 102 is configured to output an optical channel signal 104 to the optical communications link (not shown).

The controller 106 is configured to determine a respective optimal optical channel power for each section. The optimal optical channel power minimizes a sum of an indication of a linear optical noise of the section and an indication of a nonlinear optical noise of the section. The controller 106 is configured to generate at least one control signal 108 arranged to cause a target optical channel power of each section to be set to the respective optimal optical channel power.

A ninth embodiment of the invention provides an ONE having the same general structure as the ONE 100 shown in FIG. 9 and will be described with reference to FIG. 9.

The ONE of this embodiment is for use with an optical communications link which comprises a further optical amplification apparatus following the plurality of sections.

The nonlinear optical noise of a section comprises that generated in the optical fibre span at an input end of the optical fibre span, where the optical power is high enough to induce the Kerr effect. The linear optical noise comprises that generated at an output end of the optical fibre span. $K_{TRX}$ of Equation 2 does not enter into play now and can in general be neglected.

The indication of the linear optical noise is the inverse of the signal to noise ratio, SNR, of the linear optical noise of the section. The indication of the nonlinear optical noise is the inverse of the SNR of the nonlinear optical noise of the section.

The optimal optical channel power is the optical channel power for which:

$$1/SNR_{LIN}=2\cdot(1/SNR_{NL}) \quad \text{Equation 3}$$

The controller 106 is configured to determine the optimal optical channel power for each section as the optical channel power for which Equation 3 holds.

A tenth embodiment of the invention provides an ONE having the same general structure as the ONE 100 shown in FIG. 9 and will be described with reference to FIG. 9.

The ONE of this embodiment is for an optical communications link for which each optical amplification apparatus comprises an optical amplifier. The optical communications link comprise N sections, one for each i-th fibre span, where the nonlinear noise, $SNR_{NL}$, comprises that generated in the optical fibre at the input end of the fibre, which is taken to be after the i-th amplifier, and the linear noise, $SNR_{LIN}$, comprises that generated at an output end of the fibre, which is taken to be at the (i+1)-th amplifier.

In this embodiment, the linear noise is ASE noise. As reported by Vacondio et al (ibid), for one section:

$$1/SNR_{NL}=aP^2$$

and $$SNR_{ASE}=P/n$$

Equation 1 can therefore be re-written as:

$$1/SNR=n/P+aP^2 \quad \text{Equation 4}$$

The minimum noise as a function of channel power can be found by differentiating Equation 4:

$$\frac{\partial}{\partial p}(1/SNR) = \frac{-n+2ap^3}{p} \quad \text{Equation 5}$$

Which is minimal (best case) where the channel power, $P_{OPT}$, is $$P_{OPT} = \left(\frac{n}{2a}\right)^{1/3} \quad \text{Equaton 6}$$

In this condition, we get:

$$1/SNR_{ASE} = 2 \cdot (1/SNR_{NL})$$

Therefore, for each section, knowing the nonlinear noise coefficient, a, and the linear noise coefficient, n, the optimal optical channel power may be found and the optical performance of the communications link may be optimised.

For each ith section, n is the product between the (i+1)th amplifier gain and the (i+1)th amplifier noise figure which, in turn, is a known function of its gain. In more detail, $1/SNR_{ASE}$ of fibre span N is $$1/SNR_{lin} = \frac{G_{i+1} \cdot NF \cdot h \cdot f \cdot B_o}{P_{i+1}} \quad \text{Equation 7}$$
$$= \frac{L_i \cdot NF_{i+1} \cdot h \cdot f \cdot B_o}{P_i}$$
$$= \frac{n_i}{P_i}$$

so the linear noise coefficient of the ith section, $n_i$, is $$n_i = L_i \cdot NF_{i+1} \cdot h \cdot f \cdot B_o \quad \text{Equation 8}$$

where $L_i$ is the loss of the i-th fibre span, $NF_{i+1}$ is the noise figure of the (i+1)-th amplifier, i.e. the amplifier after the i-th fibre span, h is Planck's constant, f is the frequency of the optical signal and $B_o$ the optical receiver bandwidth. The receiver bandwidth may be a reference bandwidth of 12.5 GHz, which corresponds to 0.1 nm at 1550 nm (optical SNR is typically reported as the optical SNR in 0.1 nm), as long as the nonlinear noise coefficient a is scaled to the same bandwidth.

The controller 106 is configured to determine the optimal optical channel power, $P_{OPT}$, of a section as $$P_{OPT} = \left(\frac{n}{2a}\right)^{1/3},$$

where n is the linear noise coefficient of the section and a is the nonlinear noise coefficient of the section.

An eleventh embodiment of the invention provides an ONE having the same general structure as the ONE 100 shown in FIG. 9 and will be described with reference to FIG. 9.

The ONE of this embodiment may be used with an optical communications link comprising optical amplification apparatus in the form of either an optical amplifier or an optical pump source configured to deliver a Raman pump signal into the respective optical fibre span, or a combination of both.

In this embodiment the controller 106 is configure to determine the respective optimal optical channel power for each section by calculating the total noise FIG.

$$1/SNR_{LIN} + 1/SNR_{NL}$$

for each of a plurality of different optical channel powers. The controller 103 6 is configured to interpolate the calculated sum values to identify the optical channel power for which the sum has a minimum value. The method of this embodiment therefore avoids the need to differentiate equation 4, which may be advantageous if there is a more complex relationship between nonlinear noise and linear noise and channel power than is reported by Vacondio et al.

A twelfth embodiment of the invention provides an ONE having the same general structure as the ONE 100 shown in FIG. 9 and will be described with reference to FIG. 9. This embodiment is similar to the eleventh embodiment, with the following modifications.

The ONE of this embodiment may be used with an optical communications link comprising optical amplification apparatus in the form of either an optical amplifier or an optical pump source configured to deliver a Raman pump signal into the respective optical fibre span, or a combination of both.

In this embodiment, the controller 106 is configured to identifying from the calculated sum values the optical channel power for which the sum has a minimum value.

A thirteenth embodiment of the invention provides an ONE having the same general structure as the ONE 100 shown in FIG. 9 and will be described with reference to FIG. 9.

The ONE of this embodiment may be used where it has been determined that each optical amplification apparatus in the optical communications link has a constant noise figure, i.e. the noise figure is independent of gain or the optical amplification apparatus has a fixed gain. In this situation the optimal optical channel power can be found for each section in any order, and in particular one after the other, moving from the transmitting end of the link to the receiving end of the link (the "forwards" direction), or for all sections simultaneously. The ONE of this embodiment is for the forwards direction and is described, for simplicity, for use with an optical communications link comprising optical amplifiers.

The controller 106 is configured to get the fibre and equipment parameters of the communications link having N sections, namely the nonlinear noise coefficient, a, and the noise figure, NF. The controller 106 is configured to select the first section, i=1, and to check whether i≤N. The controller is configured to, if true, Y, calculate $n_i$ from $L_i$ and $NF_{(i+1)}$ for the first section, using Equation 8 above, and to calculate the optimal optical channel power, $P_{OPT,\,i}$, for the first section. The controller 106 is configured to set the target optical channel power of the first section, $P_i$, to $P_{OPT,\,i}$ and to increment i by one, to select the next section. The controller 106 is configured to repeat the checking and calculation loop for each section until i=N.

The controller 106 is configured to, once the optimal optical channel power, $P_{OPT}$, has been determined for each section, generate and transmit at least one control signal arranged to cause a target optical channel power of each section to be set to the respective optimal optical channel power. It will be appreciated that the controller 106 may be configured to generate and transmit a single control signal relating to all of the sections, or a number of control signals, each relating to one or more sections.

If the controller 106 is being operated in a "set and forget" manner, during configuration of a communications link, the controller 106 stops. If the controller is configured to operate periodically, it will recommence the step of getting the fibre and equipment parameters, and proceed to the checking and calculation loop.

A fourteenth embodiment of the invention provides an ONE having the same general structure as the ONE 100 shown in FIG. 9 and will be described with reference to FIG. 9.

The ONE of this embodiment may be used where it has been determined that each optical amplification apparatus in the optical communications link has noise figure which is gain dependent. The ONE of this embodiment is described, for simplicity, for use with an optical communications link comprising optical amplifiers. The communications link has N sections and thus has N+1 optical amplifiers.

The controller 106 is configured to get the fibre and equipment parameters of the communications link, namely the nonlinear noise coefficient, a, the noise figure, NF, and a target optical channel power, $P_{RX}$, to be output at the receiving end of the communications link. The controller 106 is configured to set the target optical channel power, $P_{N+1}$, to be output from the last optical amplifier to $P_{PX}$ 84.

The controller 106 is configured to select last section, i=N, and to check that i≥1. The controller 106 is configured to, if true, Y, retrieve $P_{i+1}$ and to calculate $n_i$ from $L_i$ and $NF_{(i+1)}$ for the last section 90, using Equation 8 above. The controller 106 is configured to calculate the optimal optical channel power, $P_{OPT,\ i}$, for the last section. The controller 106 is configured to set the target optical channel power of the last section, $P_i$, to $P_{OPT,i}$, and to decrease i by one, to select the preceding section. The controller 106 is configured to repeat the checking and calculation loop for each section moving recursively backwards from the receiving end until i=0.

Configuring the controller 106 to calculate the optimal optical channel power recursively backwards also allows the ONE to be used with optical communications links having optical amplifiers which have embedded variable optical attenuators, VOAs, for gain flattening, and therefore have noise figures which increase as the gain decreases. The relationship between noise figure and gain should however be less than a dB per dB, so that the gain, G, multiplied by the noise figure is still an increasing function of the gain. In this situation $$NF_{i+1} = NF_{i+1}(G_{i+1}) \text{ where } G_{i+1} = P_{i+1} \cdot L_i/P_i$$

Equation 5 then becomes more complex, since n is not constant anymore but depends on $P_i$ via $NF_{i+1}$ and $G_{i+1}$. The equation for $P_{OPT,i}$, that is $\partial(1/SNR)/\partial P_i = 0$, then becomes $$\frac{\partial(1/SNR)}{\partial P_i} = -\frac{n}{P_i^2} + \frac{1}{P_i}\frac{\partial n}{\partial P_i} + 2aP_i^2 = 0$$

$$\text{where } \frac{\partial n}{\partial P_i} = -\frac{L_i P_{i+1}}{P_i^2} \frac{n}{NF_{i+1}} \frac{dNF(G_{i+1})}{dG_{i+1}}$$

Figure 10:
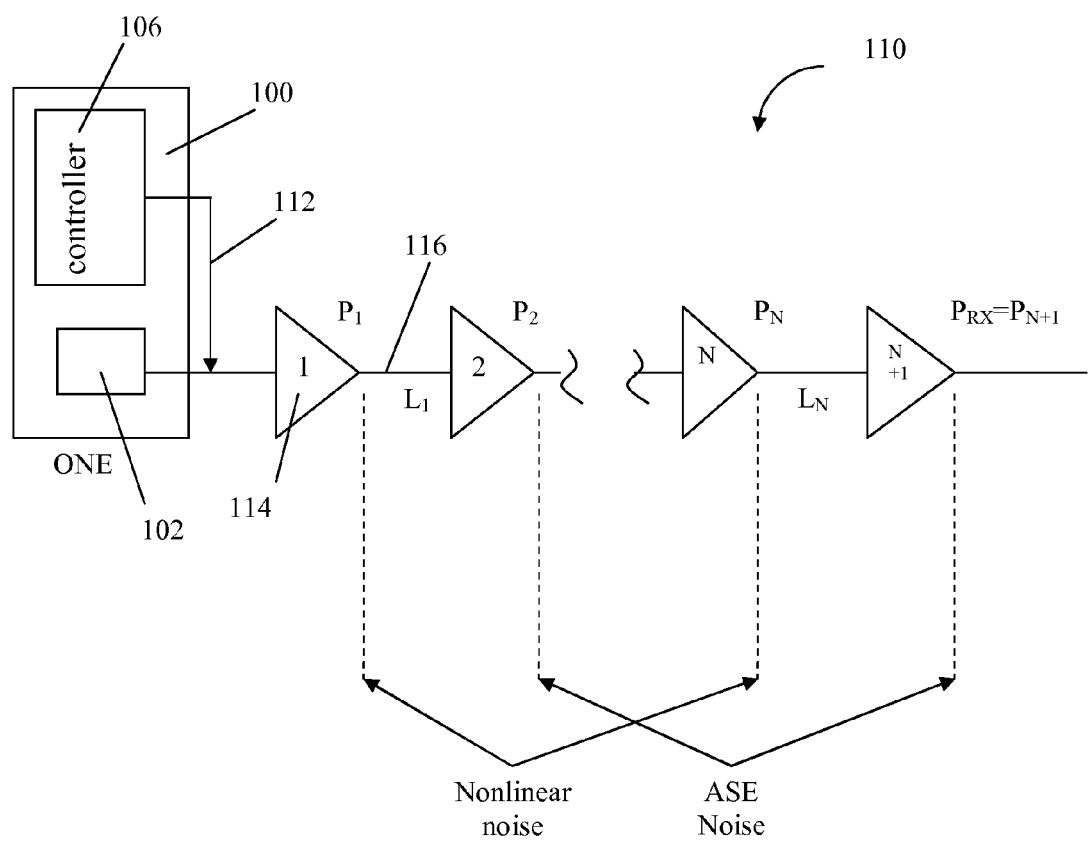
FIG. 10 is a schematic representation of an optical communications link according to a fifteenth embodiment of the invention.

A fifteenth embodiment of the invention provides an optical communications link 110, as shown in FIG. 10. The optical communications link 110 comprises a plurality, N, of sections and an ONE 100 as described in any of embodiments nine to fourteen above and shown in FIG. 9.

Each section of the optical communications link 110 comprises an optical amplification apparatus, in this example an optical amplifier 114, and an optical fibre span 116. Each section may alternatively, or additionally, comprise an optical pump source configured to deliver a Raman pump signal into the optical fibre span, The controller 106 is configured to generate and transmit at least one control signal 112.

A sixteenth embodiment of the invention provides a data carrier having computer readable instructions embodied therein for providing access to resources available on a processor. The computer readable instructions comprising instructions to cause the processor to perform any of the steps of the method of optimizing optical signal quality in an optical communications link as described in embodiments one to eight above.

The invention claimed is:

1. A method of optimizing optical signal quality in an optical communications link comprising a plurality of sections each comprising an optical amplification apparatus and an optical fibre span, the method comprising:
   for each section, determining a respective optimal optical channel power which minimizes a sum of an indication of a respective linear optical noise and an indication of a respective nonlinear optical noise; and
   generating and transmitting at least one control signal arranged to cause a target optical channel power of each section to be set to the respective optimal optical channel power.

2. A method as claimed in claim 1, wherein:
   the optical communications link further comprises a further optical amplification apparatus following the plurality of sections;
   for each section, the respective nonlinear optical noise comprises that generated at an input end of the optical fibre span and the linear optical noise comprises that generated at an output end of the optical fibre span; and
   the indication of the linear optical noise is the inverse of the signal to noise ratio, SNR, of the linear optical noise of the section and the indication of the nonlinear optical noise is the inverse of the SNR of the nonlinear optical noise of the section.

3. A method as claimed in claim 2, wherein the optimal optical channel power is the optical channel power for which the inverse of the SNR of the linear noise is equal to twice the inverse of the SNR of the nonlinear noise.

4. A method as claimed in claim 2, wherein each optical amplification apparatus comprises an optical amplifier, and wherein, for each section, the respective nonlinear optical noise comprises that generated in the optical fibre span after the respective optical amplifier and the respective linear optical noise comprises that generated at the optical amplifier of the subsequent section.

5. A method as claimed in claim 4, wherein the optimal optical channel power, $P_{OPT}$, of a section is determined as $$P_{OPT} = \left(\frac{n}{2a}\right)^{1/3},$$

where n is the linear noise coefficient of the section and a is the nonlinear noise coefficient of the section.

6. A method as claimed in claim 2, wherein the optimal optical channel power is determined by calculating the sum of the inverse of the SNR of the linear optical noise and the inverse of the SNR of the nonlinear optical noise for each of a plurality of different optical channel powers and interpolating the calculated sum values to identify the optical channel power for which the sum has a minimum value.

7. A method as claimed in claim 2, wherein the optimal optical channel power is determined by calculating the sum of the inverse of the SNR of the linear optical noise and the inverse of the SNR of the nonlinear optical noise for each of a plurality of different optical channel powers and identifying from the calculated sum values the optical channel power for which the sum has a minimum value.

8. A method as claimed in claim 1, wherein the method comprises determining whether each optical amplification apparatus has a noise figure which depends on its optical gain in a known way or an unknown way or has a noise figure which is independent of its optical gain, and if the noise figure depends on the optical gain in a known way determining the respective optimal optical channel power of each section substantially in parallel or in series forwards, starting with the first section and finishing with the last section, and if the noise figure depends on the optical gain in an unknown way or is independent of its optical gain, determining the respective optimal optical channel power of each section recursively backwards, starting with the last section and finishing with the first section.

9. A method as claimed in claim 1, wherein the method comprises setting a target optical channel power to be output at a receiving end of the optical communications link and then determining the respective optimal optical channel power of each section recursively backwards from the receiving end in accordance with the target optical channel power.

10. An optical network element for an optical communications link, wherein the optical communications link comprises a plurality of sections each comprising an optical amplification apparatus and an optical fibre span, the optical network element comprising:
an optical channel signal output configured to output an optical channel signal to the optical communications link; and
a controller configured to:
determine a respective optimal optical channel power for each section, the optimal optical channel power minimizing a sum of an indication of a respective linear optical noise and an indication of a respective nonlinear optical noise; and
generate at least one control signal arranged to cause a target optical channel power of each section to be set to the respective optimal optical channel power.

11. An optical network element as claimed in claim 10, wherein:
the optical communications link further comprises a further optical amplification apparatus following the plurality of sections;
for each section, the respective nonlinear optical noise comprises that generated at an input end of the optical fibre span and the respective linear optical noise comprises that generated at an output end of the optical fibre span; and
the indication of the linear optical noise is the inverse of the signal to noise ratio, SNR, of the linear optical noise of the section and the indication of the nonlinear optical noise is the inverse of the SNR of the nonlinear optical noise of the section.

12. An optical network element as claimed in claim 11, wherein the optimal optical channel power is the optical channel power for which the inverse of the SNR of the linear noise is equal to twice the inverse of the SNR of the nonlinear noise.

13. An optical network element as claimed in claim 11, wherein each optical amplification apparatus comprises an optical amplifier, and wherein, for each section, the respective nonlinear optical noise comprises that generated in the optical fibre span after the respective optical amplifier and the respective linear optical noise comprises that generated at the optical amplifier of the subsequent section.

14. An optical network element as claimed in claim 13, wherein the controller is configured to determine the optimal optical channel power, $P_{OPT}$, of a section as $$P_{OPT} = \left(\frac{n}{2a}\right)^{1/3},$$

where n is the linear noise coefficient of the section and a is the nonlinear noise coefficient of the section.

15. An optical network element as claimed in claim 11, wherein the controller is configured to determine the optimal optical channel power by calculating the sum of the inverse of the SNR of the linear optical noise and the inverse of the SNR of the nonlinear optical noise for each of a plurality of different optical channel powers and interpolating the calculated sum values to identify the optical channel power for which the sum has a minimum value.

16. An optical network element as claimed in claim 11, wherein the controller is configured to determine the optimal optical channel power by calculating the sum of the inverse of the SNR of the linear optical noise and the inverse of the SNR of the nonlinear optical noise for each of a plurality of different optical channel powers and identifying from the calculated sum values the optical channel power for which the sum has a minimum value.

17. An optical network element as claimed in claim 11, wherein the controller is configured to determine whether each optical amplification apparatus has a noise figure which depends on its optical gain in a known way or an unknown way or has a noise figure which is independent of its optical gain, and if the noise figure depends on the optical gain in a known way to determine the respective optimal optical channel power of each section substantially in parallel or in series forwards, starting with the first section and finishing with the last section, and if the noise figure depends on the optical gain in an unknown way or is independent of its optical gain, to determine the respective optimal optical channel power of each section recursively backwards, starting with the last section and finishing with the first section.

18. An optical network element as claimed in claim 11, wherein the controller is configured to obtain a target optical channel power to be output at a receiving end of the optical communications link and to subsequently determine the respective optimal optical channel power of each section recursively backwards from the receiving end in accordance with the target optical channel power.

19. An optical communications link comprising a plurality of sections each comprising an optical amplification apparatus and an optical fibre span and an optical network element as claimed in claim 10.

20. A nontransitory computer readable storage medium having stored therein instructions that, when executed by a processor, cause the processor to perform a method of optimizing optical signal quality in an optical communications link comprising a plurality of sections each comprising an optical amplification apparatus and an optical fibre span, the method comprising:
for each section, determining a respective optimal optical channel power which minimizes a sum of an indication of a respective linear optical noise and an indication of a respective nonlinear optical noise; and
generating and transmitting at least one control signal arranged to cause a target optical channel power of each section to be set to the respective optimal optical channel power.

* * * * *